May 25, 1926.
J. K. OLSEN
ILLUMINATED INSTRUMENT MOUNT
Filed March 30, 1925    2 Sheets-Sheet 1
1,585,784
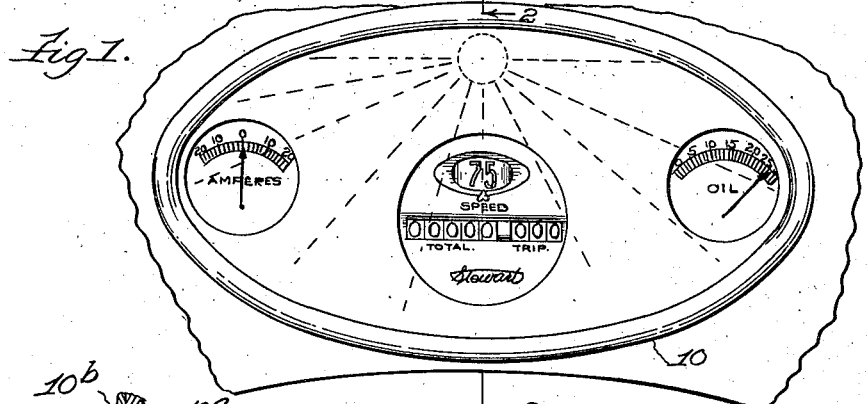
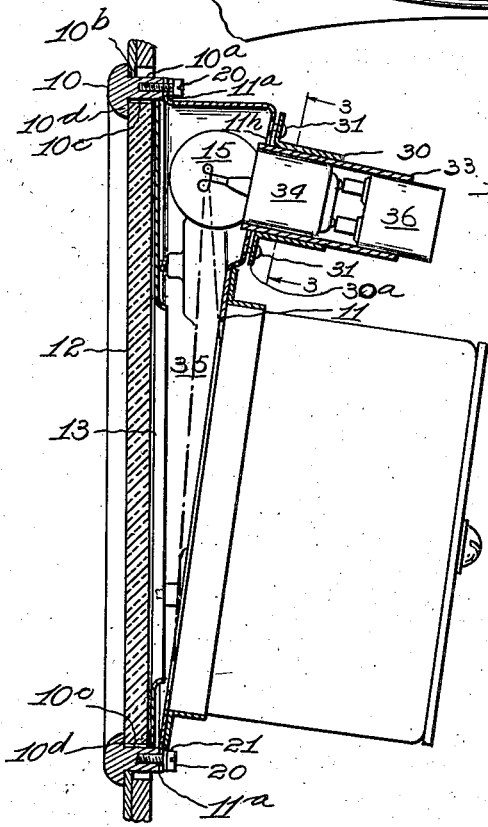
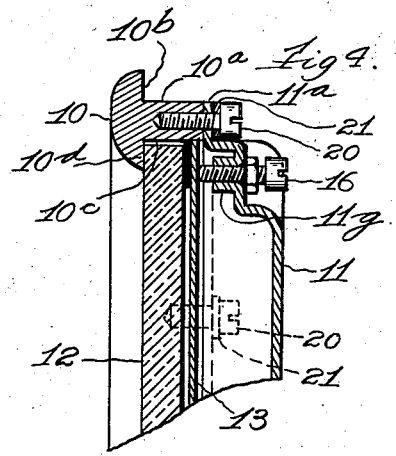
Witness.
J. C. McKnight.
Inventor:
John K. Olsen,
by Burton + Burton
his Attorneys.

May 25, 1926.
J. K. OLSEN
1,585,784
ILLUMINATED INSTRUMENT MOUNT
Filed March 30, 1925    2 Sheets-Sheet 2
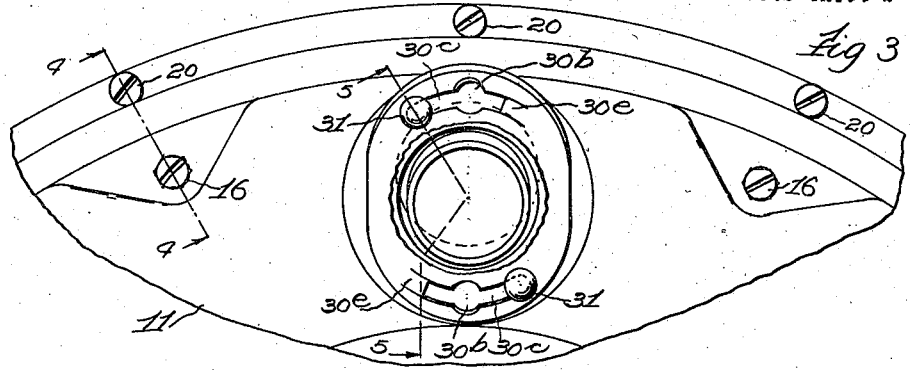
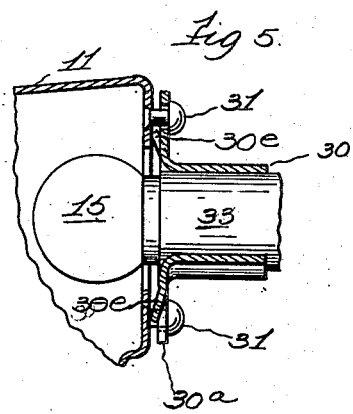 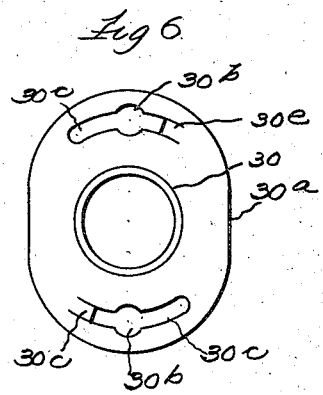
Witness
A. C. McKnight
Inventor.
John K Olsen.
by Burton & Burton
his Attorneys.

Patented May 25, 1926.

1,585,784

UNITED STATES PATENT OFFICE.

JOHN K. OLSEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

ILLUMINATED INSTRUMENT MOUNT.

Application filed March 30, 1925. Serial No. 19,216.

The purpose of this invention is to provide an improved construction of a mounting device for instruments pertaining to and carried upon a motor vehicle, particularly for the purpose of providing for the illumination of the instruments. It consists in the elements and features of construction shown and described as indicated in the claims.

In the drawings:

Figure 1 is a front elevation of the instrument board embodying this invention.

Figure 2 is a section at the line, 2—2, on Figure 1.

Figure 3 is a detail rear elevation on an enlarged scale of a limited portion of the device shown in Figure 1.

Figure 4 is a detail section at the line, 4—4, on Figure 3.

Figure 5 is a section at the line, 5—5, on Figure 3.

Figure 6 is a detail rear elevation of a portion of the instrument mount frame comprising the lamp socket holding boss with the lamp socket removed.

The structure shown in the drawings comprises an instrument mount consisting of two members, viz, a front glass and face-plate-retaining member or bezel, 10, and a rear main instrument supporting member, 11. The member, 10, is a narrow peripheral frame encompassing and holding a glass, as hereinafter more particularly described, rabbeted as to its outer periphery, as seen at 10ª, forming a shoulder, 10ᵇ, serving conveniently as a stop for the device when mounted in the dash board or instrument board of the vehicle, and rabbeted at the inner side, as seen at 10ᶜ, for accommodating and stopping by the shoulder, 10ᵈ, the glass-in-common, 12, and inwardly thereof the face plate-in-common, 13, which in the completed, assembled instrument mount enclose or cover the faces of the several instruments served by the mount. The rear instrument supporting member, 11, is as shown, a sheet metal stamping having a marginal or peripheral flange, 11ª, by which it is secured to the rear edge of the forward mount member, 10, as hereinafter more particularly described, said stamping being formed with its area inside the flange struck back from the plane of the flange to a plane making an acute angle with the plane of the flange at the lower side and divergent upwardly and rearwardly, so that at the upper margin immediately inside the flange, the forward face of said member, 11, or the bottom of the recess formed by stamping it as described, is spaced back from the plane of the peripheral flange, and thereby from the plane of the inner face of the face plate-in-common, 13, a distance sufficient to accommodate an illuminating lamp bulb, 15, hereinafter more particularly described as to its position and mounting from which the light beam is emitted into the interspace between the face plate-in-common and the forward face or bottom of the recess of the rear mount member, 11, for illuminating the faces of the instrument mounted in said rear mount member, as hereinafter more particularly described. The struck-back main portion of the area of said mount member is apertured for exposing forwardly toward the said illuminated interspace the reading faces of the several instruments carried by the mount which are secured to the rear of said mount member, 11, in any desired or convenient manner, the particular means of so mounting and securing the instrument constituting no part of the present invention, but which may be understood from the drawings without more particular description. The marginal flange of said mount member, 11, is formed for securement to the forward member, 10, and for carrying a means for clamping the face plate-in-common, 13, and glass-in-common, 12, securely in the inner rabbet of the forward member, 10, as may be understood from Figures 4 and 3, in which it may be seen that at any desired intervals in the periphery of the mount the flange has apertures for securing bolts, 20, which are screwed into the rear edge of the forward mount member, 10, suitable locking washers, 21, being interposed for rendering the attachment of the two members, 10 and 11, secure by means of these bolts. And it may be seen from said Figures 4 and 3, that at any desired intervals, and most conveniently in each instance directly inward from the holes provided for the bolts, 20, there are formed, struck forwardly from the flange for protruding toward the front member, hollow bosses, 11ᵉ, interiorly threaded for engaging set screws, 16, said hollow bosses being positioned in direct line back of the shoulder, 10ᵈ, of the inner rabbet of the member 10, so that the thrust of the said screws against the rear or inner side of the face plate-in-common, 13, is directly toward said shoulder, 10ᵈ, and thereby the screws tend to clamp the face plate and glass firmly onto the shoulder.

For mounting the lamp in the position and relation to the interspace between the forward recessed surface of the member, 10, and the rear surface of the face plate-in-common, as described, the rear mount, 11, has an aperture shown at 11ʰ. Adjacent this aperture at two or more points spaced around the center of the aperture (as shown, at two diametrically opposite points) there are mounted fixedly, headed studs, 31, 31, with their heads spaced away from the rear surface of the mount member, 10, a distance sufficient to accommodate between said surface and said heads the flange, 30ᵃ, of a flanged sleeve, 30, which is dimensioned as to its interior diameter to accommodate and hold firmly a holding sleeve, 33, for the lamp socket, 34, and contact-carrying plug, 36, the diameter of the aperture, 11ʰ, being as great as the outer diameter of the lamp bulb so that the entire assemblage, comprising the holding sleeve lamp socket and lamp bulb may be applied from the rear, the lamp entering through said aperture, 11ʰ, to position the lamp as described with respect to the interspace, 35, through which its rays are to reach the instruments to be illuminated. For securely holding the lamp socket and lamp in position, the flange, 30ᵃ, of the sleeve, 30, has apertures, 30ᵇ, 30ᵇ, diametered for admitting the heads of the headed studs, 31, and arcuate slots, 30ᶜ, leading from the head-admitting apertures, 30ᵇ, having width equal to the diameter of the studs back of their heads so that upon applying the flanged sleeve to the studs entering the heads of the studs through the apertures, 30ᵇ, and turning the sleeve through an angle corresponding to the extent of the arcuate slots, the flange is engaged behind the heads of the studs. To render this engagement secure and adapted to hold the lamp steadily in position, there is struck forwardly from the flange, 30ᵃ, preferably at the opposite side of the head admitting apertures from the arcuate slots, arcuate spring tongues, 30ᵉ, whose ends standing normally displaced from the plane of the flange, encounter the margin around the aperture, 11ʰ, in the mount member, 11, so that in order to engage the flange under the heads of the studs and turn the sleeve, 30, for engaging the studs in the arcuate slots, it is necessary to press the said sleeve firmly against the rear side of the mount member, 11, so that when the sleeve has been turned for engaging the studs in the arcuate slots as described, the spring tongues react for rendering the engagement firm and preventing accidental disengagement.

I claim:—

1. An instrument mount for motor vehicles and the like comprising a marginal front frame member and a back frame member adapted to be applied and secured to the rear side of said front frame member, the back member having apertures for accommodating the instruments with their reading faces exposed forwardly through said apertures, said frame being marginally extended forwardly from the plane of exposure of the instrument faces to a plane oblique to and making an acute angle with said plane of exposure, and means for mounting and positioning the face plate at said oblique plane between the two frame members.

2. In the construction defined in claim 1, foregoing, a glass-in-common lodged in the front frame member in front of the face plate-in-common therein.

3. In an instrument mount in combination with a front marginal frame and a back mounting frame, the mounting frame having apertures for accommodating the instruments to be served, with their reading faces exposed forwardly through said apertures, the forward marginal frame being rabbeted at the rear side for seating a glass and a face plate behind the glass, the back frame being marginally arranged for seating and being secured at the back side of the front frame outside the area of said rabbet and having inwardly from the seating and secured margin hollow internally threaded bosses for adjusting and clamping bolts positioned for impinging on a marginal portion of the rear or inner surface of the face plate for clamping it against the rearwardly facing shoulder of the rabbet.

4. An instrument mount for motor vehicles and the like comprising a marginal front frame member and a back frame member adapted to be applied and secured to the rear side of said front frame member, the back member having apertures for accommodating an instrument with its reading face exposed forwardly through said aperture and being marginally extended forwardly from the plane of exposure of the instrument face to a plane oblique to and making an acute angle with said plane of exposure; means for mounting and positioning the glass at said oblique plane between the two frame members, the back frame having means for mounting a lamp with its illuminating zone at the position in the periphery of said frames at which the plane of the instrument face exposure and the plane of the glass are widely separated by reason of the divergence of said planes.

5. An instrument mount for motor vehicles and the like comprising a marginal front frame member and a back frame member adapted to be applied and secured to the rear side of said front frame member, the back member having apertures for accommodating an instrument with its reading face exposed forwardly through said aperture and being marginally extended forwardly from the plane of exposure of the instrument face to a plane oblique to and making an acute angle with said plane of exposure; a face plate at said oblique plane between the two frame members, the back frame having means for mounting a lamp with its illuminating zone at the position in the periphery of said frame at which the plane of instrument face of the exposure and the plane of face plate are widely separated by reason of the divergence of said plane.

6. An instrument mount comprising a web which carries the instrument frame or casing having an aperture positioned for accommodating a lamp for illuminating the face of the instrument, and a headed stud mounted in the web proximate to the lamp aperture and projecting rearwardly; a socket-carrying member having a flange apertured for admitting the stud head and having an arcuate slot narrower than the stud head extending from the head-admitting aperture and having also an arcuate spring tongue struck out forwardly proximate to the stud-admitting aperture for reacting to hold said flange snugly against the stud head.

7. An instrument mount comprising a web which carries the instrument frame or casing having an aperture positioned for accommodating a lamp for illuminating the face of the instrument, rearwardly projecting headed studs mounted in the web proximate to the lamp aperture and spaced from each other in a circle about the axis of the lamp socket; a socket-carrying member having a flange with apertures distributed about the axis for registering with the stud heads, and having arcuate slots narrower than the stud heads extending from the head-admitting apertures respectively in the same direction around the axis, and spring means for holding the flange stopped against the heads of the studs.

8. An instrument mount comprising a web which carries the instrument frame or casing having an aperture positioned for accommodating a lamp for illuminating the face of the instrument, rearwardly projecting headed studs mounted in the web proximate to the lamp aperture and spaced from each other in a circle about the axis of the lamp socket; a socket-carrying member having a flange with apertures distributed about the axis for registering with the stud heads, and having arcuate slots narrower than the stud heads extending from the head-admitting apertures respectively in the same direction around the axis, and arcuate spring tongues struck out forwardly from the flange proximate to the stud-admitting apertures, respectively at the sides thereof outside the arcuate slots respectively.

In testimony whereof, I have hereunto set my hand at Chicago, Illinois, this 26 day of March, 1925.

JOHN K. OLSEN.